(12) United States Patent
Himmelsbach et al.

(10) Patent No.: US 11,756,310 B2
(45) Date of Patent: Sep. 12, 2023

(54) METHOD AND DEVICE FOR SENSOR DATA FUSION FOR A VEHICLE

(71) Applicant: Bayerische Motoren Werke Aktiengesellschaft, Munich (DE)

(72) Inventors: Michael Himmelsbach, Munich (DE); Luca Trentinaglia, Eichenau (DE); Dominik Bauch, Muehldorf am Inn (DE); Daniel Meissner, Friedberg (DE); Josef Mehringer, Gmund (DE); Marco Baumgartl, Gilching (DE)

(73) Assignee: Bayerische Motoren Werke Aktiengesellschaft, Munich (DE)

( * ) Notice: Subject to any disclaimer, the term of this patent is extended or adjusted under 35 U.S.C. 154(b) by 28 days.

(21) Appl. No.: 17/423,938

(22) PCT Filed: Oct. 18, 2019

(86) PCT No.: PCT/EP2019/078424
§ 371 (c)(1),
(2) Date: Jul. 19, 2021

(87) PCT Pub. No.: WO2020/160795
PCT Pub. Date: Aug. 13, 2020

(65) Prior Publication Data
US 2022/0092870 A1 Mar. 24, 2022

(30) Foreign Application Priority Data

Feb. 5, 2019 (DE) .......................... 102019102769.1

(51) Int. Cl.
*G06V 20/58* (2022.01)
*G06V 10/80* (2022.01)
(Continued)

(52) U.S. Cl.
CPC ............ *G06V 20/58* (2022.01); *G06V 10/803* (2022.01); *G06V 20/56* (2022.01); *B60W 50/0098* (2013.01); *B60W 2556/35* (2020.02)

(58) Field of Classification Search
CPC ...... G06V 20/58; G06V 10/803; G06V 20/56; B60W 50/0098; B60W 2556/35; G06F 18/25
See application file for complete search history.

(56) References Cited

U.S. PATENT DOCUMENTS 7,991,550 B2   8/2011   Zeng
2008/0300787 A1 *  12/2008   Zeng ..................... G01S 13/931
                                                         701/301

(Continued)

FOREIGN PATENT DOCUMENTS

DE   10133945 A1   2/2003

OTHER PUBLICATIONS

Berthold Philipp et al.: "Radar reflection characteristics of vehicles for contour and feature estimation", 2017 Sensor Data Fusion: Trends, Solutions, Applications (SDF), IEEE, Oct. 10, 2017, pp. 1-6, DOI:10.1109/SDF.2017.8126352; XP033274066, sections I, III-VIII; abstract; figures 1-6.

(Continued)

*Primary Examiner* — Md K Talukder
(74) *Attorney, Agent, or Firm* — 2SPL Patent Attorneys PartG mbB; Kieran O'Leary

(57) ABSTRACT

A method and device for sensor data fusion for a vehicle as well as a computer program and a computer-readable storage medium are disclosed. At least one sensor device (S1) is associated with the vehicle (F), and in the method, fusion object data is provided representative of a fusion object ($O_F$) detected in an environment of the vehicle (F); sensor object data is provided representative of a sensor object ($O_S$)

(Continued)

detected by the sensor device (S1) in the environment of the vehicle (F); indicator data is provided representative of an uncertainty in the determination of the sensor object data; reference point transformation candidates of the sensor object ($O_S$) are determined depending on the indicator data; and an innovated fusion object is determined depending on the reference point transformation candidates.

10 Claims, 3 Drawing Sheets

(51) Int. Cl.
 *G06V 20/56* (2022.01)
 *B60W 50/00* (2006.01)

(56) References Cited

U.S. PATENT DOCUMENTS

| | | | | |
|---|---|---|---|---|
| 2012/0140061 | A1* | 6/2012 | Zeng | G01S 13/726 348/148 |
| 2018/0356505 | A1* | 12/2018 | Miyata | B60K 31/0008 |
| 2020/0025873 | A1* | 1/2020 | Kubertschak | G01S 17/89 |
| 2020/0126429 | A1* | 4/2020 | Fröhlich | G08G 1/202 |
| 2022/0092870 | A1* | 3/2022 | Himmelsbach | G06V 20/58 |

OTHER PUBLICATIONS

Naujoks Benjamin et al.: "An Orientation Corrected Bounding Box Fit Based on the Convex Hull under Real Time Constraints", 2018 IEEE Intelligent Vehicles Symposium (IV), IEEE, Jun. 26, 2018, pp. 1-6, DOI:10.1109/IVS.2018.8500692; XP033423609; sections I, III-V; abstract; figures 1-8.

Wilking Benjamin: "Generic Sensor Data Fusion in Information Space and a New Approach to Processing Dense Sensor Data", PhD-Thesis, Ulm, Germany, Feb. 5, 2018, XP055663478, chapter 2-4.

Seeliger Florian: "Fahrzeugübergreifende Informationsfusion für ein Kreuzassistenzsystem", Schriftenreihe des Instituts für Mess-, Regel-und Mikrotechnik, Jul. 19, 2017, XP055657349, ISBN: 978-3-941543-35-5, chapters 2-6, appendix B, English translation of the abstract on p. 15.

* cited by examiner

METHOD AND DEVICE FOR SENSOR DATA FUSION FOR A VEHICLE

CROSS-REFERENCE TO RELATED APPLICATIONS

This application is a 35 U.S.C. § (c) national stage entry of PCT/EP2019/078424, filed on Oct. 18, 2019. That application claimed priority to German Application 10 2019 102 769.1 filed on Feb. 5, 2019. The contents of the earlier filed applications are incorporated by reference herein in their entirety.

FIELD

The invention relates to a method and device for sensor data fusion for a vehicle. In addition, the invention relates to a computer program, and a computer-readable storage medium.

BACKGROUND

Heterogeneous sensor devices are often used to detect objects in the vicinity of a vehicle, in particular to detect other road users and their relevant characteristics. Detected objects in the vehicle environment may be used for the safe implementation of assistance functions, in particular for longitudinal control functions such as Active Cruise Control, or an intersection assistant, and for lateral control functions such as Lateral Collision Avoidance, Steering and Lane Guidance Assistant.

Due to different measuring principles of the sensor devices used, the information about the objects detected by the sensor devices may be different. Due to limited computing power in vehicles, the information provided by the sensor devices is usually fused at a high-level. This means that the sensor devices each separately recognize objects on the basis of the sensed information and provide the same as information in an abstract, sensor-independent object representation (so-called "sensor objects"); the information provided is then merged and/or fused by a separate sensor data fusion unit each into a respective object representation for each actual object (so-called "fusion objects").

For example, a rectangle or cuboid may be used as an object representation (cf. FIG. 1). For this object representation, each object O is assigned several geometric reference points on the contour of the object O (illustrated here as black points). For each of these reference points, a lateral displacement (x,y) of the reference point, an orientation of the object O, for example the angle to the x-axis of the reference coordinate system R, as well as the length l (with respect to the x-axis) and width b (with respect to the y-axis) with respect to the corresponding reference point may be determined and assigned to the reference point with respect to a reference coordinate system R, for example relative to a predetermined reference point on/in the vehicle. A reference point A of the object O, which is used for object representation in sensor data fusion and to which further properties of the object O may be assigned in addition to the lateral displacement (x,y) as the position of the object O and a width b, length l and orientation, is also referred to in the following as a "state". For example, the height h (with respect to the z-axis), speed or object type may optionally be recorded and stored in the object representation. Each measured quantity of the object O may be modeled as a normally distributed random variable with variance and covariances with respect to the other measured quantities and these values may also be assigned to the state. The properties of the object O always refer to the geometric reference point A on the contour of the object O. Thus, in order to perform a fusion of the properties of different sensor objects, a detailed treatment of the reference points of the sensor and fusion objects is required.

The task underlying the invention is to provide a method for sensor data fusion for a vehicle, as well as a corresponding device, a computer program and computer-readable storage medium, which contributes to a reliable assignment of sensor and fusion objects and enables reliable sensor data fusion.

SUMMARY

The task is solved by the independent patent claims. Advantageous implementations are indicated in the sub-claims.

According to a first aspect, the invention relates to a method for sensor data fusion for a vehicle. At least one sensor device is associated with the vehicle.

In the method, a fusion object data set is provided. The fusion object data set includes fusion object data each representative of a fusion object detected in an environment of the vehicle. A fusion reference point is assigned to each fusion object.

Furthermore, sensor object data representative of a sensor object detected by the respective sensor device in the environment of the vehicle is provided. A sensor reference point is assigned to the sensor object.

Furthermore, indicator data is provided that is representative of an uncertainty in the determination of the sensor object data.

Depending on the indicator data, reference point transformation candidates of the sensor object are determined.

Further, depending on the reference point transformation candidates, an innovated fusion object is determined.

The fusion reference point and/or sensor reference point may also be referred to as the state of the fusion object and/or sensor object. In particular, the fusion and/or sensor reference point is used for object representation and preferably comprises relevant properties of the corresponding fusion and/or sensor object.

In particular, the indicator data may include variances and/or covariances in the determination of the sensor object data and/or a sensor type and/or a field of view of the sensor device. For example, the indicator data may be provided by the sensor device. Alternatively or additionally, the indicator data may be at least partially stored, for example, in the sensor data fusion unit. This is advantageous, for example, in the case of a field of view of the sensor device that is fixed by the installation direction.

Reference point transformation candidates are those reference points of the sensor object that are eligible for subsequent transformation for subsequent fusion with a fusion object.

The step of determining an innovated fusion object depending on the reference point transformation candidates may in particular comprise a transformation of the sensor object with respect to one of the reference point transformation candidates. For example, all properties of the sensor object that relate to the sensor reference point are determined with respect to the corresponding reference point transformation candidate. The determined reference point transformation candidate to which the transformed properties are assigned is also referred to as the transformation state in the following. If both the fusion reference point and the transformation state refer to the same reference point, e.g., a corner point of an object, the properties of the sensor and fusion object may be compared in an association step. If sensor object and fusion object represent the same, actual object, the sensor object may be assigned to the fusion object (association) and an innovative fusion object (fusion) may be determined.

Advantageously, the proposed method may avoid a negative effect of incorrect reference point information on the fusion result, thus contributing to the reliability of sensor data fusion.

In an advantageous embodiment according to the first aspect, the sensor object data and fusion object data is representative of a lateral extent and/or an orientation of the sensor object and fusion object, respectively.

In this case, the fusion reference point and/or the sensor reference point lies on a contour of the sensor object and/or on a contour of the fusion object.

Further, the indicator data is representative of an uncertainty in the determination of lateral extent and/or orientation.

In a further advantageous embodiment according to the first aspect, the sensor object data as well as the fusion object data are representative of a rectangular or cuboid representation of the sensor object and the fusion object, respectively. The respective sensor object and/or the respective fusion object thereby extends laterally rectangularly along its longitudinal axis with a length and along its transverse axis with a width in an orientation with respect to the vehicle. In addition, a reference point is assigned to each corner of the rectangle and to each center of its sides. One of the reference points each forms the fusion reference point and/or the sensor reference point.

The indicator data includes a first characteristic value representative of an uncertainty in the determination of the length. Further, the indicator data includes a second characteristic value representative of an uncertainty in the determination of the width. In addition, the indicator data includes a third characteristic value that is representative of an uncertainty in the orientation determination.

The first characteristic value is compared to a predetermined first threshold value; the second characteristic value is compared to a separate predetermined second threshold value; and the third characteristic value is compared again to a separate predetermined third threshold value.

In the case that the first characteristic value exceeds the first threshold value and the second characteristic value is less than or equal to the second threshold value and the third characteristic value is less than or equal to the third threshold value, only reference points of the sensor object along its transverse axis are assigned to the sensor object as reference point transformation candidates.

In the case that the second characteristic value exceeds the second threshold value and the first characteristic value is less than or equal to the first threshold value and the third characteristic value is less than or equal to the third threshold value, only reference points of the sensor object along its longitudinal axis are assigned to the sensor object as reference point transformation candidates.

In the case that the third characteristic value exceeds the third threshold value and/or in the case that both the first characteristic value exceeds the first threshold value and the third characteristic value exceeds the third threshold value, no reference point of the sensor object is assigned to the sensor object as a reference point transformation candidate.

In this way, uncertainties in the determination of the respective quantity may be taken into account in an advantageous manner. In particular, this embodiment may limit the number of possible transformations depending on the uncertainty of the length, width and orientation. For example, without knowledge of the length, it is not possible to change from a rear to a front reference point; furthermore, without knowledge of the orientation of the object, no reference point change is possible at all.

To decide whether the extent or orientation of an object is known or not, a threshold is applied to the uncertainty of the respective quantity. If the uncertainty exceeds the specific threshold value, the quantity is considered unknown and the possibility of transformation is restricted accordingly. For example, with unknown length and known width and orientation, a transformation along the back or front side of the object is still possible. This ensures that only known quantities have an influence on the transformation.

In a further advantageous embodiment according to the first aspect, the indicator data is representative of the corresponding sensor device being able to detect the lateral extent of an object and/or the orientation of the object.

In the method, reference points of the sensor object are assigned to the sensor object as reference point transformation candidates only if they have been determined by a sensor device capable of detecting the lateral extent of an object and the orientation of the object.

In an advantageous way, already known uncertainties in the determination and/or ignorance of the respective quantity may thus be taken into account. Depending on the respective physical measuring principle, not every sensor device installed in vehicles may detect the lateral extent of an object (e.g., RaDAR). Likewise, the orientation of an object may not be determined by any installed sensor device; the assumption that the orientation of an object corresponds to its direction of motion does not apply to stationary objects. In this context, the indicator data may in particular be representative of a type of the sensor device and may be stored in the sensor data fusion unit. By way of example, for each specific sensor device installed, it may be decided individually whether the corresponding sensor device is capable of detecting the lateral extent of an object and/or the orientation of the object. Typically, this applies to ultrasonic and RaDAR sensors; LiDAR, Light Detection And Ranging, and camera sensors, on the other hand, often allow the detection of even extended objects and their orientation.

In a further advantageous embodiment according to the first aspect, the indicator data is representative of a field of view of the sensor device.

Depending on the sensor object data and the indicator data, it is determined whether the corresponding sensor object is located within a predetermined range within the field of view of the corresponding sensor device.

As a result, reference points of the sensor object are assigned as reference point transformation candidates to the sensor object only if the same is located within the specified range within the field of view of the corresponding sensor device.

As soon as a sensor device only partially detects an object at the edge of its field of view (and is not aware of it), the semantic information conveyed by the detected reference point may be incorrect. For example, if the sensor device sees only half the length of the object, the position of the detected reference point "center side" may not correspond to the actual center of the side of the object facing the sensor device, even though the reference point detected as "center side" is within the detection range of the sensor device. Thus, in this embodiment, the detected reference point of the sensor object may either be discarded entirely or the corresponding sensor object may be evaluated as a point target as explained below.

Advantageously, this allows uncertainty in the detection of the sensor object to be taken into account if it is outside or at the edge of the field of view of the sensor device. The field of view may be specified by the installation direction and, for example, may be stored in the sensor data fusion unit after a factory calibration. The specified range within the field of view is intended to ensure that the sensor object is sufficiently distanced from the edge of the field of view, but in individual cases it may correspond to the complete field of view.

In a further advantageous embodiment according to the first aspect, it is checked whether a reference point transformation candidate is associated with the sensor object.

In the event that a reference point transformation candidate is assigned to the sensor object, a respective transformation state each of the sensor object with respect to the respective reference point transformation candidate is determined as a function of the sensor object and compared with a fusion object each; furthermore, as a function of the comparison, the sensor object is assigned to a fusion object and an innovated fusion object is determined as a function of the corresponding transformation state of the sensor object and the fusion object data.

In the case that no reference point transformation candidate is assigned to the sensor object, the sensor object is evaluated as a point target and a shortest distance each between the reference points of the sensor object and the reference points of a respective fusion object is determined; a respective transformation state of the respective fusion object with respect to the corresponding reference point of the fusion object which has the shortest distance to the corresponding reference point of the sensor object is determined and compared with the sensor object; depending on the comparison, the sensor object is then assigned to a fusion object and, depending on the corresponding transformation state of the fusion object and the sensor object data, an innovated fusion object is determined.

In other words—if no reference point transformation candidate is assigned to the sensor object (and a change of the current reference point of the sensor object is therefore not possible)—a transformation candidate of the fusion object is searched which is closest to the invariant reference point of the sensor object. To determine the association of sensor and fusion object and for possible subsequent fusion, the state of the fusion object is then transformed into the found reference point, i.e., a transformation of the fusion object takes place.

In the case that no reference point transformation candidate is assigned to the sensor object, it may happen that no common reference point results for a pair of assigned sensor and fusion objects.

Since the list of transformation candidates of the fusion object may also be limited (e.g., due to unknown extension), the reference point found for the fusion object does not necessarily have to match the reference point of the sensor object.

A point target is a non-extended object and/or an object without lateral extension whose position is not associated with a reference point; instead, it is assumed that the position of the point target may correspond to any reference point on the (rectangular) object contour. In this case, the sensor or fusion reference point of the object may be disregarded.

In a further advantageous embodiment according to the first aspect, the fusion object is assigned a respective visual range characteristic value depending on the respective assigned sensor object, which is representative of the visual range of the respective sensor device.

Depending on the corresponding fusion object data and the respective visual range characteristic value, it is then determined whether the corresponding fusion object is located within a predetermined range within the field-of-view of the corresponding sensor device.

If the fusion object is located outside the specified area within the respective field of view of all corresponding sensor devices, the innovated fusion object is then evaluated as a point target.

Advantageously, this allows uncertainty in the determination of the fusion object to be taken into account if it is located outside or at the edge of the visual range of all the sensor devices on whose measurement data the fusion object is based.

In a further advantageous embodiment according to the first aspect, determining the innovated fusion object involves checking whether the fusion object or the sensor object has been evaluated as a point target.

In case only the sensor object was evaluated as a point target, the fusion reference point of the fusion object is taken over as fusion reference point of the innovated fusion object.

In the case that neither the fusion object nor the sensor object has been evaluated as a point target or in the case that only the fusion object was evaluated as a point target, the sensor reference point of the sensor object is taken over as the fusion reference point of the innovated fusion object.

For example, in the case where both sensor object and fusion object have been evaluated as point targets, the closest pair may be determined from all possible reference points, i.e., from the reference point transformation candidates of the sensor object and the transformation candidates of the fusion object. The states are transformed accordingly to the two reference points and then fused. The new reference point of the fusion object after the fusion is the reference point found in the search for the nearest pair for the fusion object.

According to a second aspect, the invention relates to a sensor data fusion device for a vehicle. The device is configured to perform a method according to the first aspect. The device may also be referred to as a sensor data fusion unit.

According to a third aspect, the invention relates to a computer program for sensor data fusion for a vehicle. The computer program includes instructions that, when the program is executed by a computer, cause the computer to perform the method according to the first aspect.

According to a fourth aspect, the invention relates to a computer-readable storage medium on which the computer program according to the fourth aspect is stored.

BRIEF DESCRIPTION OF THE FIGURES

Examples of embodiments of the invention are explained in more detail below with reference to the schematic drawings, in which.

DETAILED DESCRIPTION

Elements of the same construction or function are provided with the same reference signs throughout all Figures.

Figure 1:
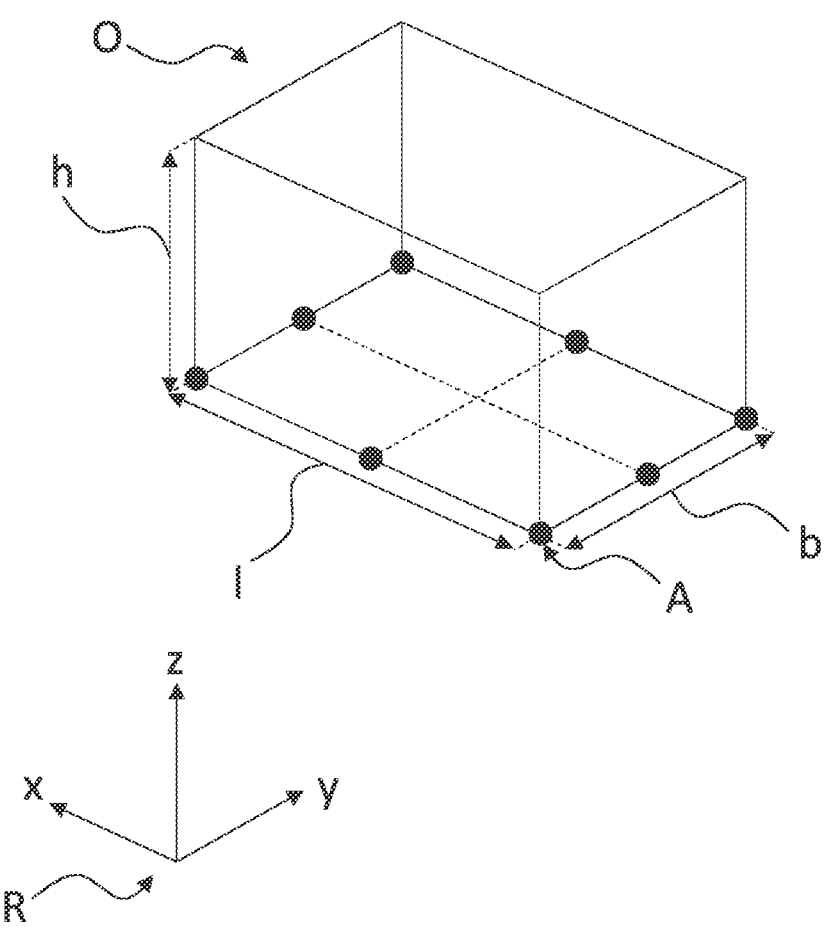
FIG. 1 shows an exemplary object representation.
Figure 2:
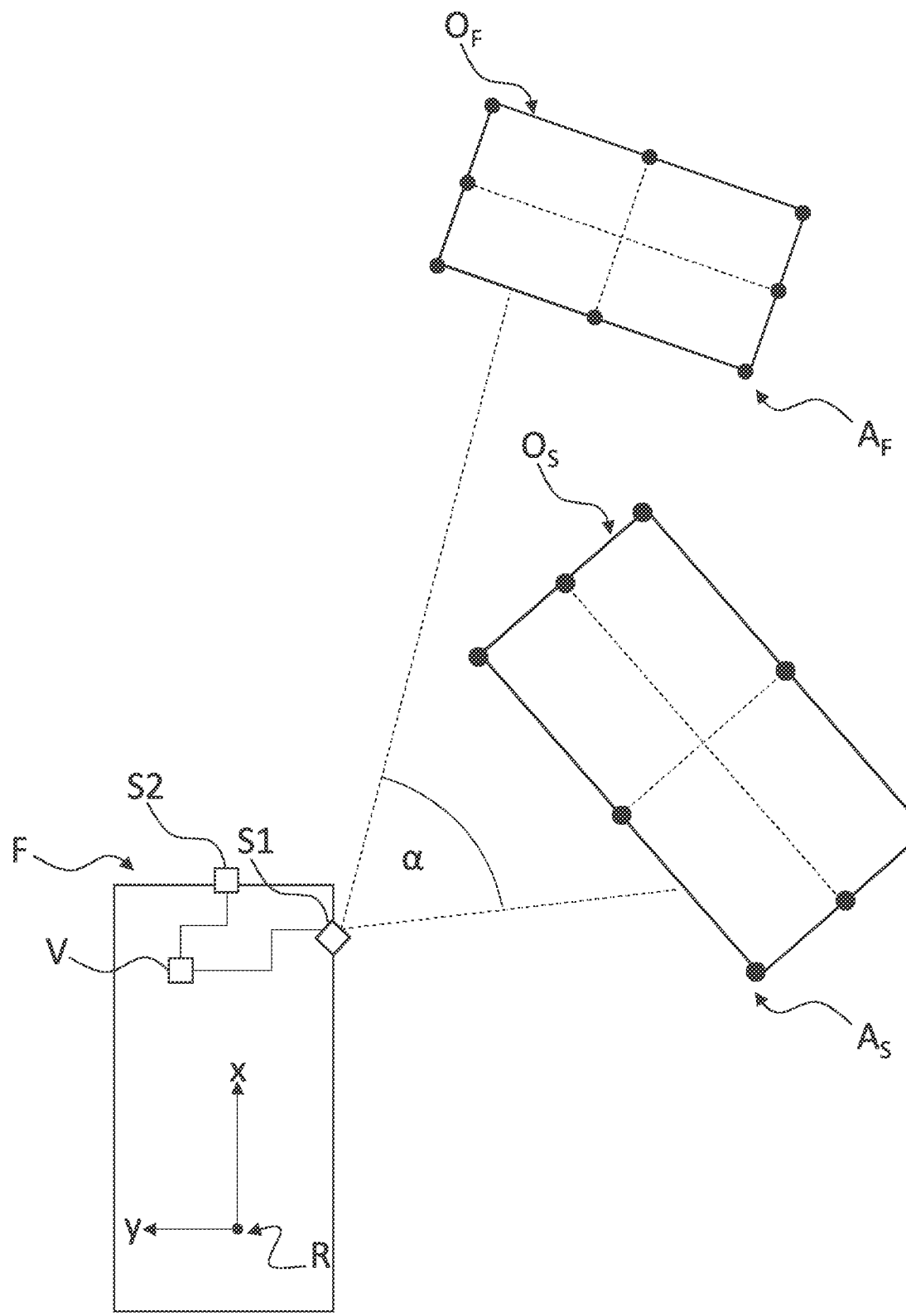
FIG. 2 shows an embodiment of a vehicle according to the invention with a device for sensor data fusion.

In the following, a method for high-level object fusion is proposed, which provides a reference point treatment appropriate to the particular sensor and object. By means of the embodiment of FIG. 2, a vehicle F according to the invention is shown with a device V for sensor data fusion as well as a sensor device S1, which is set up for detecting objects, in particular other road users and relevant properties thereof, and for determining a corresponding sensor object $O_S$. This may be, for example, a camera, LiDAR, Light Detection And Ranging, LaDAR, Laser Detection And Ranging, RaDAR, Radio Detection And Ranging, ultrasonic, point laser, or an infrared sensor. Regardless of the method used for high-level object fusion, in the automotive field as a result of object fusion usually a list of rectangles or cuboids (cf. FIG. 1) is output as an object representation, which represent detected, in particular moving, objects in the environment of the vehicle F. FIG. 2 shows such a fusion object $O_F$, which is assigned a fusion reference point $A_F$, a length l and width b with respect to the fusion reference point $A_F$, an orientation of the fusion object $O_F$ with respect to a reference coordinate system R of the vehicle F, and an indicator characteristic value each which is representative of an uncertainty in the determination of the length l, width b and orientation. The uncertainty may be expressed, for example, by a variance. FIG. 2 further shows a sensor object $O_S$ determined by the sensor device S1, which is assigned a sensor reference point $A_S$, a length l and width b with respect to the fusion reference point $A_S$, an orientation of the fusion object $O_S$ with respect to a reference coordinate system R of the vehicle F, and an indicator characteristic value each which is representative of an uncertainty in the determination of the length l, width b and orientation.

The sensor device S1 is associated, by its orientation and physical characteristics, with a field of view or visual range indicated by dashed lines around the angle α.

The vehicle F further comprises, by way of example, a further sensor device S2 also arranged to detect the environment of the vehicle F. The sensor devices S1, S2 are signal-coupled to the sensor data fusion device V. Sensor object data provided by the sensor devices S1, S2 may be fused by the device V according to any high-level object fusion method and stored in a fusion object data set. Exemplarily reference is made in this context to the remarks of N. Kämpchen in "Feature-level fusion of laser scanner and video data", Ulm: Ulm University, 2007; and F. Seeliger in "Fahrzeugübergreifende Informationsfusion," Ulm: Schriftenreihe des Instituts für Mess-, Regel-und Mikrotechnik der Universität Ulm, 2017.

In order to carry out the association between sensor and fusion objects and, if necessary, to fuse the associated objects, a common reference point may first have to be found in order to make the properties of the objects comparable. The change of the reference point of an object requires knowledge of the extension (length and width) as well as the orientation of the object. However, this requirement cannot always be met in practice, for example due to the physical measurement principle of the sensor device, or incomplete object detection, so that reliable sensor data fusion is compromised.

In order to avoid negative effects of wrong reference point information on the fusion result, e.g., wrong positioning of objects, an extended treatment of the reference points of objects appropriate to the respective sensor and object is proposed.

Figure 3:
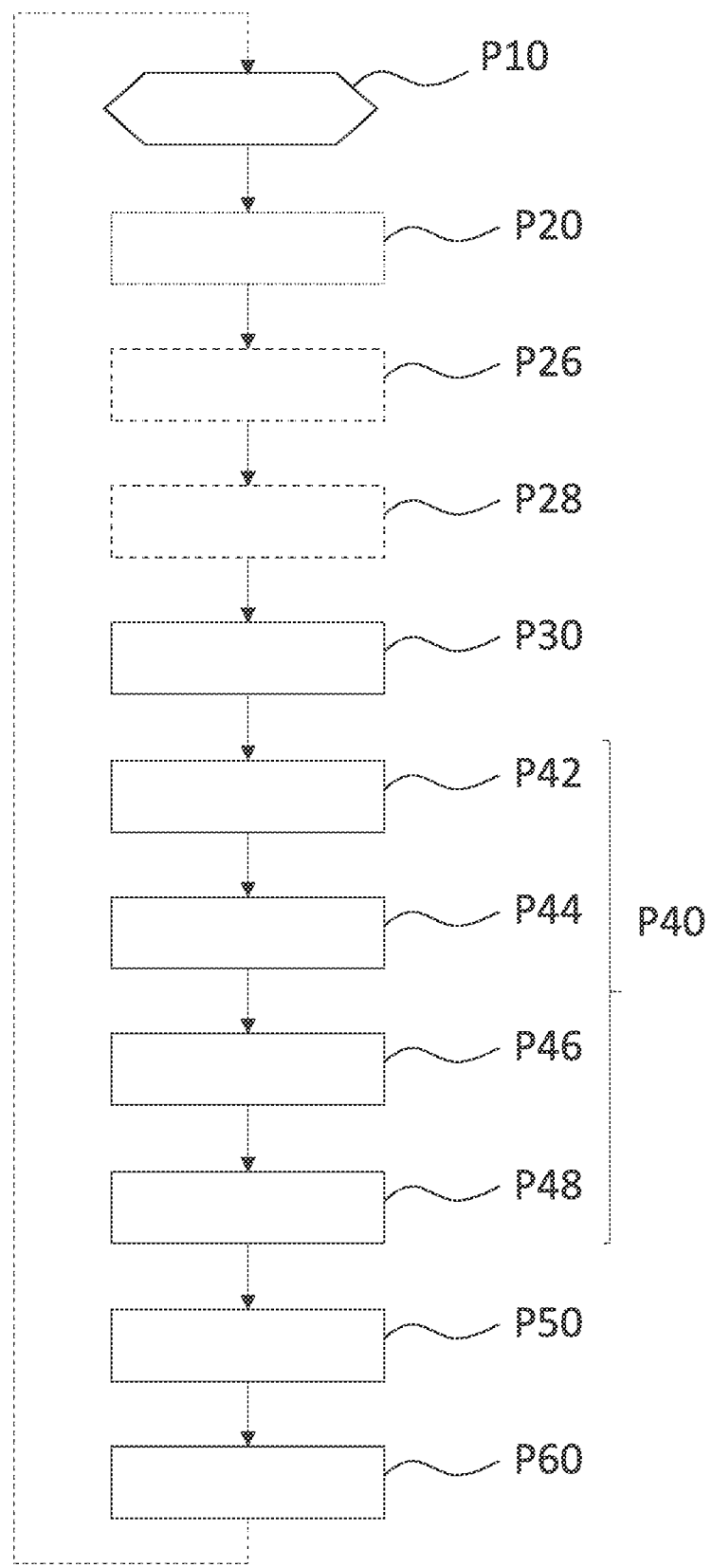
FIG. 3 shows an exemplary flow chart of a sensor data fusion method.

In this context, the device V is associated in particular with a data and program memory in which a computer program is stored, which is explained in more detail below with reference to the flow chart in FIG. 3.

In a first step P10, a fusion object data set is provided comprising fusion object data representative of the fusion object $O_F$. For example, the fusion object data set is stored in a data memory of the device V and was determined from the sensor object data of the sensor devices S1, S2 in a previous fusion process.

The program continues in a step P20 of providing sensor object data representative of the fusion object $O_S$.

In a subsequent step P30, indicator data representative of an uncertainty in the determination of the sensor object data is provided. The indicator data may comprise, for example, above-mentioned indicator characteristic values describing the uncertainty in the respective determination of length l, width b and orientation of the sensor object $O_S$, for example by variances. Furthermore, the indicator data may be representative that the sensor device S1 is technically capable of detecting the lateral extent and orientation of the sensor object $O_S$. Exemplarily, a sensor type is stored in the device V for this purpose or is determined in a step P26 preceding the step P30. Further, the indicator data may be representative of the visual range of the sensor device S1. For example, the visual range may also be stored in the device V or determined in a step P28 preceding the step P30.

The method is then continued in a step P40, in which reference point transformation candidates of the sensor object $O_S$ are determined depending on the indicator data. For this purpose, in a step P46, the indicator characteristic values are compared with a predefined threshold value each. If the respective uncertainty exceeds the respective threshold value, the quantity is considered unknown and the possibility of reference point transformation is restricted accordingly. Thus, only reference points of the sensor object $O_S$ along its back or front side are determined as reference point transformation candidates if the length l is unknown, but width b and orientation are known.

If the width b is unknown, but length l and orientation are known, only reference points of the sensor object $O_S$ along its longitudinal axis are determined as reference point transformation candidates. If both the length l and the width b and/or the orientation of the sensor object $O_S$ are unknown, the sensor object $O_S$ is considered as a point target to which no reference point transformation candidates are assigned.

In an optional step P42 before or after step P46, depending on the indicator data, it is checked whether the sensor device S1 is technically capable of detecting the lateral extension and orientation of the sensor object $O_S$. For example, if the sensor device S1 is an ultrasonic or RaDAR sensor that does not meet this requirement, the sensor object $O_S$ is considered a point target.

In an optional step P44 before or after the step P46, depending on the indicator data, it is checked whether the sensor object $O_S$ is outside the field of view of the sensor device S1 or at the edge thereof. In this case, the sensor object $O_S$ is also considered as a point target.

In a step P50 following step P46, an innovated fusion object is determined depending on the reference point transformation candidates. For this purpose, it is first checked whether reference point transformation candidates are assigned to the sensor object $O_S$ at all or whether it is a point target. Furthermore, it is checked whether the fusion object $O_F$ is a point target, for example in a step P48 preceding the step P50. If both objects are no point targets, an association with the fusion object $O_F$ is performed, in which the reference point transformation is restricted to the reference point transformation candidates, and the transformed sensor object $O_S$ and/or a transformation state is subsequently fused with the fusion object $O_F$, i.e., the innovated fusion object is determined. The sensor reference point is adopted as the fusion reference point of the innovated fusion object.

In the case where the sensor object $O_S$ or the fusion object $O_F$ is a point target, a pair of the locally closest possible reference points of the sensor object $O_S$ and the fusion object $O_F$ is determined. Based on the properties of the sensor and fusion objects in these reference points, a decision is made about an association and fusion is performed if necessary. This does not necessarily result in a common reference point for both objects.

The fusion reference point of the innovated fusion object is the sensor reference point if the fusion object $O_F$ is a point target, or the fusion reference point if the sensor object $O_S$ is a point target.

Finally, in a subsequent step P60, the innovated fusion object is assigned an updated visual range characteristic value representative of the visual range of the sensor device S1 as well as of all sensor devices contributing to the fusion so far.

The program is then terminated or, if necessary, continued after a predetermined interruption in step P10 with an updated object data set.

In step P48, the visual range characteristic value associated with the fusion object $O_F$ is used to check whether the fusion object $O_F$ is a point target. For this purpose, it is checked whether the fusion object $O_F$ is located outside the field of view of all sensor devices S1, S2 contributing to the fusion or is located at the edge thereof. If this is the case, the fusion object is evaluated as a point target.

The invention claimed is:

1. A method of sensor data fusion for a vehicle (F), wherein a sensor device (S1) is associated with the vehicle (F), and wherein in the method
    a fusion object data set is provided comprising fusion object data each representative of a fusion object ($O_F$) detected in an environment of the vehicle (F), each fusion object ($O_F$) being associated with a fusion reference point,
    sensor object data is provided, which is representative of a sensor object ($O_S$) detected by the respective sensor device (S1) in the environment of the vehicle (F) and to which a sensor reference point ($A_S$) is assigned,
    indicator data is provided that is representative of an uncertainty in the determination of the sensor object data,
        wherein the indicator data comprises a first, a second, and a third characteristic of the sensor object ($O_S$), the first characteristic value representative of an uncertainty in the determination of a length (l), a second characteristic value representative of an uncertainty in the determination of a width (b), and a third characteristic value representative of an uncertainty in the determination of an orientation ($\alpha$), and
        wherein the first, second and third characteristic values are each compared with a separate predetermined threshold value,
    reference point transformation candidates of the sensor object ($O_S$) are determined depending on the indicator data,
        wherein reference point transformation candidates are determined when either the first characteristic or the second characteristic are less than or equal to the respective threshold value, and
        wherein the third characteristic is less than or equal to the respective threshold value, and
    depending on the reference point transformation candidates, an innovated fusion object is determined.

2. The method according to claim 1, wherein
the sensor object data and fusion object data is representative of a lateral extent and/or an orientation of the sensor object ($O_S$) and/or fusion object ($O_F$),
the fusion reference point ($A_F$) and/or sensor reference point ($A_S$) lies on a contour of the sensor object ($O_S$) and/or fusion object ($O_F$), and
the indicator data is representative of an uncertainty in the determination of the lateral extent and/or orientation.

3. The method according to claim 1, wherein
the sensor object data and fusion object data is representative of a rectangular or cuboid representation of the sensor object ($O_S$) and/or fusion object ($O_F$), wherein the respective sensor object ($O_S$) and/or fusion object ($O_F$) extends laterally rectangularly along its longitudinal axis with the length (l) and along its transverse axis with the width (b) in the orientation ($\alpha$) relative to the vehicle (F) and each corner of the rectangle and each centre point of its sides a reference point is assigned each,
wherein one of the reference points each forms the fusion reference point ($A_F$) and/or sensor reference point($A_S$), and in the event that
the first characteristic value exceeds the respective threshold value and the second and third characteristic values are less than or equal to the respective threshold value, only reference points of the sensor object ($O_S$) along its transverse axis are assigned to the sensor object ($O_S$) as reference point transformation candidates,
the second characteristic value exceeds the respective threshold value and the first and third characteristic values are less than or equal to the respective threshold value, only reference points of the sensor object ($O_S$) along its longitudinal axis are assigned to the sensor object ($O_S$) as reference point transformation candidates,
the third characteristic value exceeds the respective threshold value or the first and the second characteristic values exceed the respective threshold value, no reference point of the sensor object ($O_S$) is assigned to the sensor object ($O_S$) as reference point transformation candidate.

4. The method according to claim 3, wherein
the indicator data is representative of the fact that the corresponding sensor device (S1) is capable of detecting the lateral extent of an object and/or the orientation of the object, and
reference points of the sensor object ($O_S$) are assigned to the sensor object ($O_S$) as reference point transformation candidates only if they have been determined by a sensor device (S1) which is capable of detecting the lateral extent of an object and the orientation of the object.

5. The method according to claim 3, wherein
the indicator data is representative of a visual range of the sensor device (S1),
depending on the sensor object data and the indicator data, it is determined whether the corresponding sensor object ($O_S$) is located within a predetermined range within the visual range of the corresponding sensor device (S1), and
reference points of the sensor object ($O_S$) are assigned to the sensor object ($O_S$) as reference point transformation candidates only if it is located within the predetermined range within the visual range of the corresponding sensor device (S1).

6. The method according to claim 3,
wherein it is checked whether a reference point transformation candidate is associated with the sensor object ($O_S$),
wherein in the case that a reference point transformation candidate is associated with the sensor object ($O_S$):
depending on the sensor object ($O_S$), a transformation state each of the sensor object ($O_S$) with respect to the respective reference point transformation candidate is determined and compared with a respective fusion object ($O_F$);
depending on the comparison, the sensor object ($O_S$) is assigned to a fusion object ($O_F$), and depending on the corresponding transformation state of the sensor object ($O_S$) and the fusion object data, an innovated fusion object is determined;
and in the case that no reference point transformation candidate is assigned to the sensor object ($O_S$), the sensor object ($O_S$) is evaluated as a point target and:
a shortest distance each between the reference points of the sensor object ($O_S$) and the reference points of a respective fusion object ($O_F$) is determined;
a transformation state each of the respective fusion object ($O_F$) with respect to the corresponding reference point of the fusion object ($O_F$), which has the shortest distance to the corresponding reference point of the sensor object ($O_S$), is determined and compared with the sensor object ($O_S$);
depending on the comparison, the sensor object ($O_S$) is assigned to a fusion object ($O_F$), and depending on the corresponding transformation state of the fusion object ($O_F$) and the sensor object data, an innovated fusion object is determined.

7. The method according to claim 6, wherein
the fusion object ($O_F$) is assigned, depending on the respective assigned sensor object,
a visual range characteristic value each which is representative of the visual range of the respective sensor device (S1),
depending on the respective fusion object data and the respective visual range characteristic value, it is determined whether the fusion object ($O_F$) is located within a predetermined range within the visual range of the corresponding sensor device (S1), and
the innovated fusion object is evaluated as a point target if the fusion object ($O_F$) is located outside the predetermined area within the respective visual range of all corresponding sensor devices (S1).

8. The method according to claim 6, wherein in determining the innovated fusion object, it is checked whether the fusion object ($O_F$) or the sensor object ($O_S$) have been evaluated as a point target, wherein:

in case only the sensor object ($O_S$) has been evaluated as a point target, the fusion reference point of the fusion object ($O_F$) is taken over as fusion reference point of the innovated fusion object, and
in case neither the fusion object ($O_F$) nor the sensor object ($O_S$) has been evaluated as a point target or only the fusion object ($O_F$) has been evaluated as a point target, the sensor reference point ($A_S$) of the sensor object ($O_S$) is taken over as fusion reference point of the innovated fusion object.

9. A non-transitory, computer-readable storage medium storing a computer program for sensor data fusion for a vehicle (F), wherein the computer program comprises instructions which, when the computer program is executed by a computer, cause the same to execute the method according to claim 1.

10. A sensor data fusion device (V) to determine an innovated fusion object for a vehicle (F), wherein the device (V) is configured to:
obtain a fusion object data set comprising fusion object data each representative of a fusion object ($O_F$) detected in an environment of the vehicle (F), each fusion object ($O_F$) being associated with a fusion reference point,
obtain sensor object data, which is representative of a sensor object ($O_S$) detected by the respective sensor device (S1) in the environment of the vehicle (F) and to which a sensor reference point ($A_S$) is assigned,
obtain indicator data, which is representative of an uncertainty in the determination of the sensor object data,
wherein the indicator data comprises a first, a second, and a third characteristic of the sensor object ($O_S$), the first characteristic value representative of an uncertainty in the determination of a length (l), a second characteristic value representative of an uncertainty in the determination of a width (b), and a third characteristic value representative of an uncertainty in the determination of an orientation ($\alpha$), and
wherein the first, second and third characteristic values are each compared with a separate predetermined threshold value,
determine reference point transformation candidates of the sensor object ($O_S$) depending on the indicator data,
wherein reference point transformation candidates are determined when either the first characteristic or the second characteristic are less than or equal to the respective threshold value, and
wherein the third characteristic is less than or equal to the respective threshold value, and
determine the innovated fusion object based on the reference point transformation candidates.

* * * * *